United States Patent
Takeda et al.

(10) Patent No.: US 10,763,498 B2
(45) Date of Patent: Sep. 1, 2020

(54) NEGATIVE ELECTRODE AND NON-AQUEOUS ELECTROLYTE SECONDARY BATTERY INCLUDING THE SAME

(71) Applicant: TOYOTA JIDOSHA KABUSHIKI KAISHA, Toyota-shi, Aichi-ken (JP)

(72) Inventors: Kazuhisa Takeda, Toyota (JP); Yuji Yokoyama, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 96 days.

(21) Appl. No.: 16/101,652

(22) Filed: Aug. 13, 2018

(65) Prior Publication Data

US 2019/0115592 A1   Apr. 18, 2019

(30) Foreign Application Priority Data

Oct. 13, 2017 (JP) .................................. 2017-199512

(51) Int. Cl.
| | |
|---|---|
| H01M 4/36 | (2006.01) |
| H01M 4/485 | (2010.01) |
| H01M 4/134 | (2010.01) |
| H01M 4/133 | (2010.01) |
| H01M 10/0525 | (2010.01) |
| H01M 4/62 | (2006.01) |
| H01M 4/66 | (2006.01) |
| H01M 2/30 | (2006.01) |
| H01M 2/08 | (2006.01) |
| H01M 10/42 | (2006.01) |
| H01M 4/48 | (2010.01) |
| H01M 4/02 | (2006.01) |

(52) U.S. Cl.
CPC ............ *H01M 4/366* (2013.01); *H01M 2/08* (2013.01); *H01M 2/30* (2013.01); *H01M 4/133* (2013.01); *H01M 4/134* (2013.01); *H01M 4/483* (2013.01); *H01M 4/485* (2013.01); *H01M 4/621* (2013.01); *H01M 4/661* (2013.01); *H01M 10/0525* (2013.01); *H01M 10/42* (2013.01); *H01M 2004/027* (2013.01); *H01M 2004/028* (2013.01)

(58) Field of Classification Search
None
See application file for complete search history.

(56) References Cited

FOREIGN PATENT DOCUMENTS

| | | | |
|---|---|---|---|
| JP | 10-270084 A | 10/1998 | |
| JP | 2001332245 A | * 11/2001 | ............ H01M 10/05 |
| JP | 2016-046033 A | 4/2016 | |

* cited by examiner

*Primary Examiner* — Karie O'Neill Apicella
(74) *Attorney, Agent, or Firm* — Sughrue Mion, PLLC

(57) ABSTRACT

A negative electrode for a non-aqueous electrolyte secondary battery of the present disclosure includes a negative electrode current collector, a negative electrode composite material layer formed on the surface of the negative electrode current collector. The negative electrode composite material layer includes a negative electrode active material containing silicon oxide and heat expandable microcapsules. The ratio of silicon oxide to the total amount of the negative electrode active material is 30 mass % or less. The blending ratio of the heat expandable microcapsules to the total amount of the negative electrode active material is 0.5 mass % or more. The ratio of the heat expandable microcapsules in contact with silicon oxide to the amount of the heat expandable microcapsules contained in the negative electrode composite material layer is 70 mass % or more.

17 Claims, 4 Drawing Sheets

NEGATIVE ELECTRODE AND NON-AQUEOUS ELECTROLYTE SECONDARY BATTERY INCLUDING THE SAME

This non-provisional application is based on Japanese Patent Application 2017-199512 filed on Oct. 13, 2017 with the Japan Patent Office, the entire contents of which are hereby incorporated by reference.

BACKGROUND

Field

The present disclosure relates to a negative electrode and a non-aqueous electrolyte secondary battery including the same.

Description of the Background Art

Japanese Patent Laying-Open No. 2016-046033 discloses a negative electrode active material for a lithium secondary battery including particles containing silicon such as silicon oxide as a negative electrode active material.

Japanese Patent Laying-Open No. 10-270084 discloses that thermosensitive microcapsules, which will break when the temperature rises and thus release inclusions, are applied to the surfaces of the electrode composite material so as to prevent a reaction from occurring in the battery.

SUMMARY

Silicon oxide has a higher capacity than a carbon-based negative electrode active material such as graphite, and has attracted attention as a negative electrode active material from the viewpoint of increasing the capacity of a secondary battery. However, when being charged or discharged, silicon oxide has a higher expansion coefficient and a higher contraction coefficient than the carbon-based negative electrode active material.

Thus, with reference to FIG. 3, when the insulation by a separator 30 is broken by nail penetration with a nail 5 or the like, an internal short circuit occurs among the positive electrode (a positive electrode current collector 11 and a positive electrode composite material layer 12), the nail 5 and a negative electrode (a negative electrode current collector 21 and a negative electrode composite material layer 22), which causes a short circuit current to flow in the direction of arrows illustrated in FIG. 3. As a result, heat is generated in the vicinity of the short-circuited position (nail 5).

With reference to FIGS. 2(a) and 2(b), when the negative electrode active material contains silicon oxide 3, silicon oxide 3 contracts greatly due to quick discharge. Thus, voids are formed in the negative electrode composite material layer, and an electrolyte solution 1 flows into the voids (from the state illustrated in FIG. 2(a) to the state illustrated in FIG. 2(b)). Due to the heat generated from an internal short circuit, the inner temperature of the battery will rise, and the electrolyte solution 1 may react with the negative electrode active material (the carbon-based negative electrode active material 2 and silicon oxide 3), which may bring further temperature rise (thermal runaway).

Accordingly, an object of the present disclosure is to provide a negative electrode for a non-aqueous electrolyte secondary battery containing silicon oxide in a negative electrode composite material layer, and a non-aqueous electrolyte secondary battery including the same capable of preventing an electrolyte solution from reacting with a negative electrode active material when heat is generated from an internal short circuit or the like so as to suppress further temperature rise.

[1] A negative electrode for a non-aqueous electrolyte secondary battery of the present disclosure includes a negative electrode current collector and a negative electrode composite material layer formed on a surface of the negative electrode current collector. The negative electrode composite material layer includes a negative electrode active material containing silicon oxide, and heat expandable microcapsules. The ratio of silicon oxide to the total amount of the negative electrode active material is 30 mass % or less. The blending ratio of the heat expandable microcapsules to the total amount of the negative electrode active material is 0.5% by mass or more. The ratio of the heat expandable microcapsules in contact with silicon oxide to the total amount of the heat expandable microcapsules contained in the negative electrode composite material layer is 70 mass % or more.

According to the present disclosure, by including the heat expandable microcapsules in the negative electrode composite material layer, in a negative electrode for a non-aqueous electrolyte secondary battery containing silicon oxide in the negative electrode composite material layer and a non-aqueous electrolyte secondary battery including the same, it is possible to prevent the electrolyte solution from reacting with the negative electrode active material when heat is generated from an internal short circuit or the like so as to suppress further temperature rise. The reason therefor will be explained hereinafter.

As illustrated in FIGS. 1(a) and 1(b), when an internal short circuit (nail penetration) or the like occurs, it generates heat, silicon oxide 3 contracts greatly due to quick discharge. However, in the present disclosure, heat expandable microcapsules 4 expand due to the heat generated from an internal short circuit or the like so as to fill the voids resulted from the contraction of silicon oxide 3. Thereby, an electrolyte solution 1 is prevented from flowing into the negative electrode composite material layer, preventing the electrolyte solution 1 from contacting the negative electrode active material (the carbon-based negative electrode active material 2 and silicon oxide 3). Therefore, the electrolyte solution is prevented from reacting with the negative electrode active material so as to suppress further temperature rise (thermal runaway).

after various investigations, the inventors of the present disclosure have found that if the following conditions (i) to (iii) are fulfilled, when heat is generated from an internal short circuit or the like, the heat expandable microcapsules may expand so as to more reliably fill the voids resulted from the contraction of silicon oxide, and thereby, the electrolyte solution is prevented from reacting with the negative electrode active material, which makes it possible to reliably suppress further temperature rise. Specifically, (i) the ratio of silicon oxide to the total amount of the negative electrode active material is 30 mass % or less, (ii) the blending ratio of the heat expandable microcapsules to the total amount of the negative electrode active material is 0.5 mass % or more, and (iii) the ratio of the heat expandable microcapsules in contact with silicon oxide to the total amount of the heat expandable microcapsules contained in the negative electrode composite material layer is 70 mass % or more.

[2] Preferably, each of the heat expandable microcapsules includes a shell made of a thermoplastic resin and a thermal expansion agent enclosed in the shell. In this case, when heat is generated from an internal short circuit or the like, the thermal expansion agent vaporizes or sublimates, which makes the heat expandable microcapsules instantaneously expand, preventing the electrolyte solution from reacting with the negative electrode active material, and thereby, it is possible to more reliably suppress further temperature rise.

[3] The present disclosure also relates to a non-aqueous electrolyte secondary battery including the negative electrode according to the above [1] or [2]. By including the negative electrode mentioned above, when heat is generated from an internal short circuit or the like, it is possible to prevent the electrolyte solution from reacting with the negative electrode active material so as to suppress further temperature rise.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment of the present disclosure (hereinafter referred to as "the present embodiment") will be described. It should be noted that the following description is not intended to limit the scope of the present disclosure.

<Non-Aqueous Electrolyte Secondary Battery>

The term of "non-aqueous electrolyte secondary battery" in the present specification refers to such a battery that does not contain water in the electrolyte. Hereinafter, the non-aqueous electrolyte secondary battery may be abbreviated as "battery" where necessary.

Figure 1A:
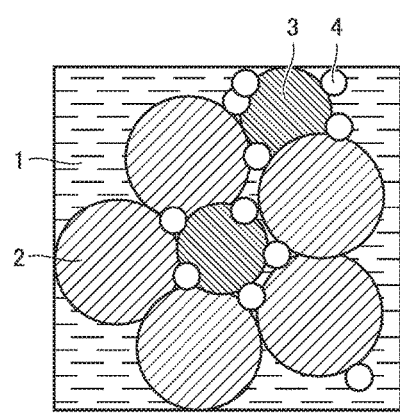
FIGS. 1(a) and 1(b) are conceptual diagrams for explaining a state of a negative electrode before nail penetration and a state thereof after nail penetration according to an embodiment.
Figure 1B:
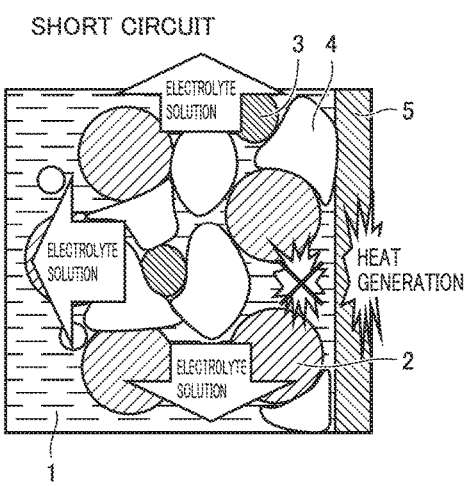
Figure 2A:
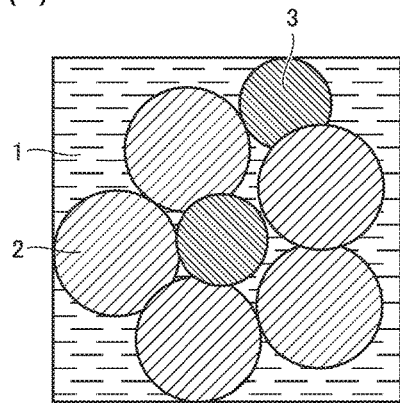
FIGS. 2(a) and 2(b) are conceptual diagrams for explaining a state of a conventional negative electrode before nail penetration and a state thereof after nail penetration.
Figure 2B:
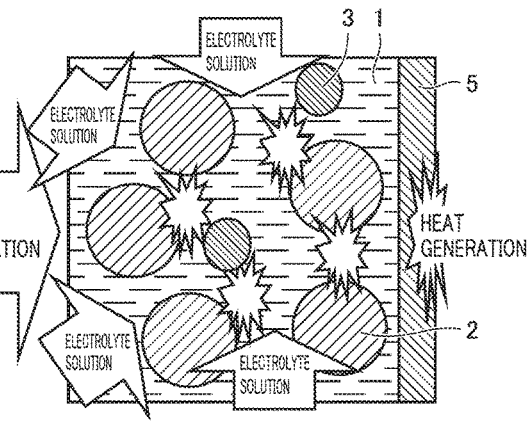
Figure 3:
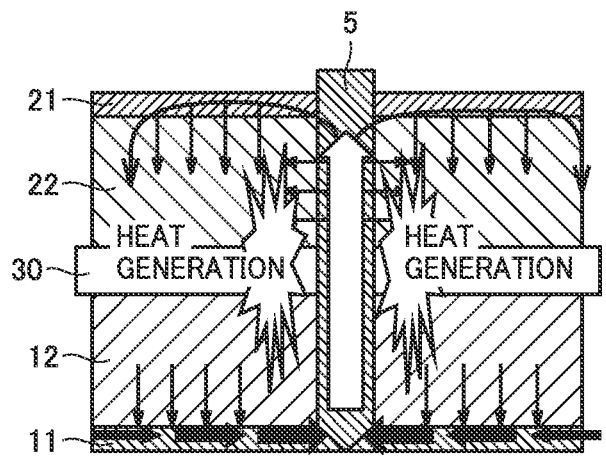
FIG. 3 is a conceptual diagram for explaining a current flow and heat generating positions at the time of nail penetration in a conventional negative electrode.
Figure 4:
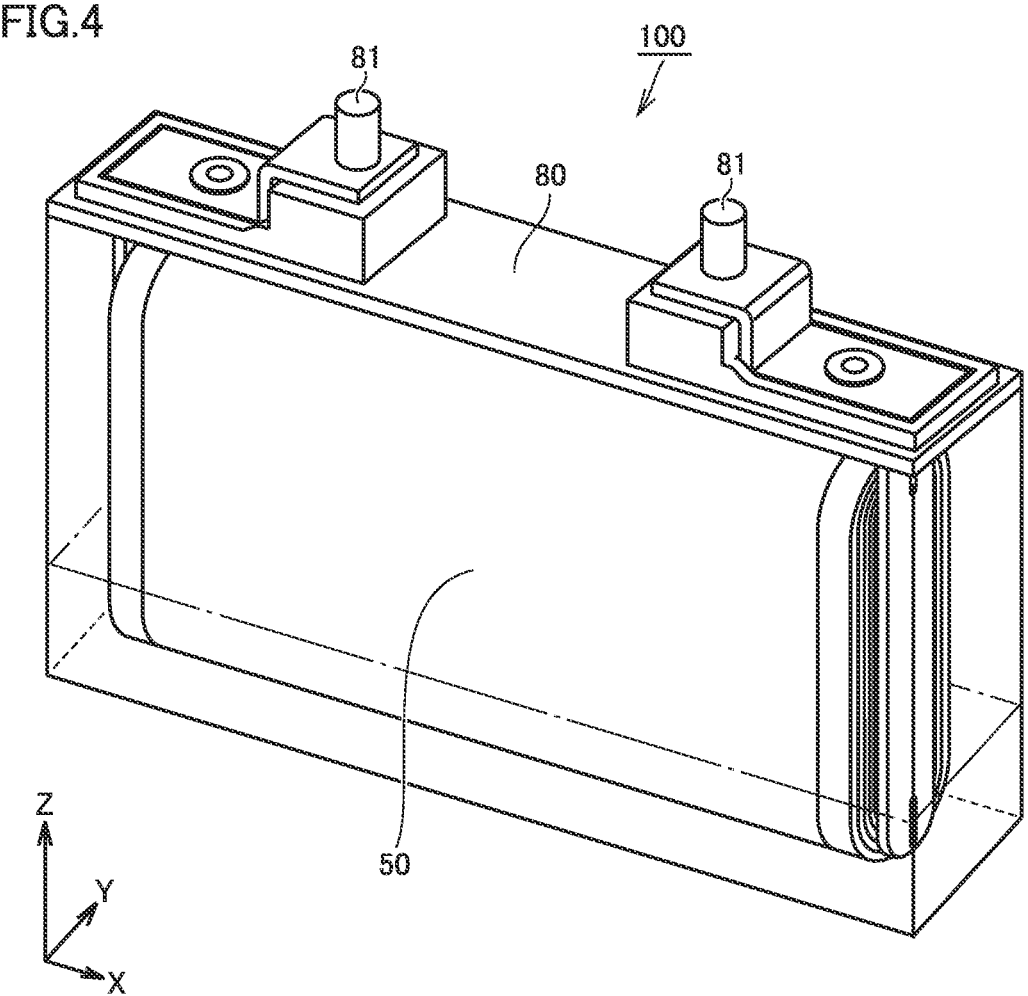
FIG. 4 is a schematic diagram illustrating an example configuration of a non-aqueous electrolyte secondary battery according to an embodiment.

FIG. 4 is a schematic diagram illustrating one example configuration of a non-aqueous electrolyte secondary battery according to the present embodiment. The battery 100 includes a battery case 80. The battery case 80 has a square shape (flat rectangular parallelepiped shape). However, the battery case according to the present embodiment may be cylindrical. The battery case 80 may be made of a metal material such as Al alloy, stainless steel (SUS) and iron (Fe), or a resin material. The battery case 80 may be made of a composite material of a metal material and a resin material (for example a pouch made of an aluminum laminated film or the like).

The battery case 80 is hermetically sealed. The battery case 80 is provided with a pair of terminals 81. The battery case 80 may be provided with a current interruption mechanism (CID) (not shown), a gas discharge valve, a liquid injection port and the like. The battery case 80 houses an electrode group 50 and an electrolyte solution. The electrode group 50 is electrically connected to the pair of terminals 81.

Figure 5:
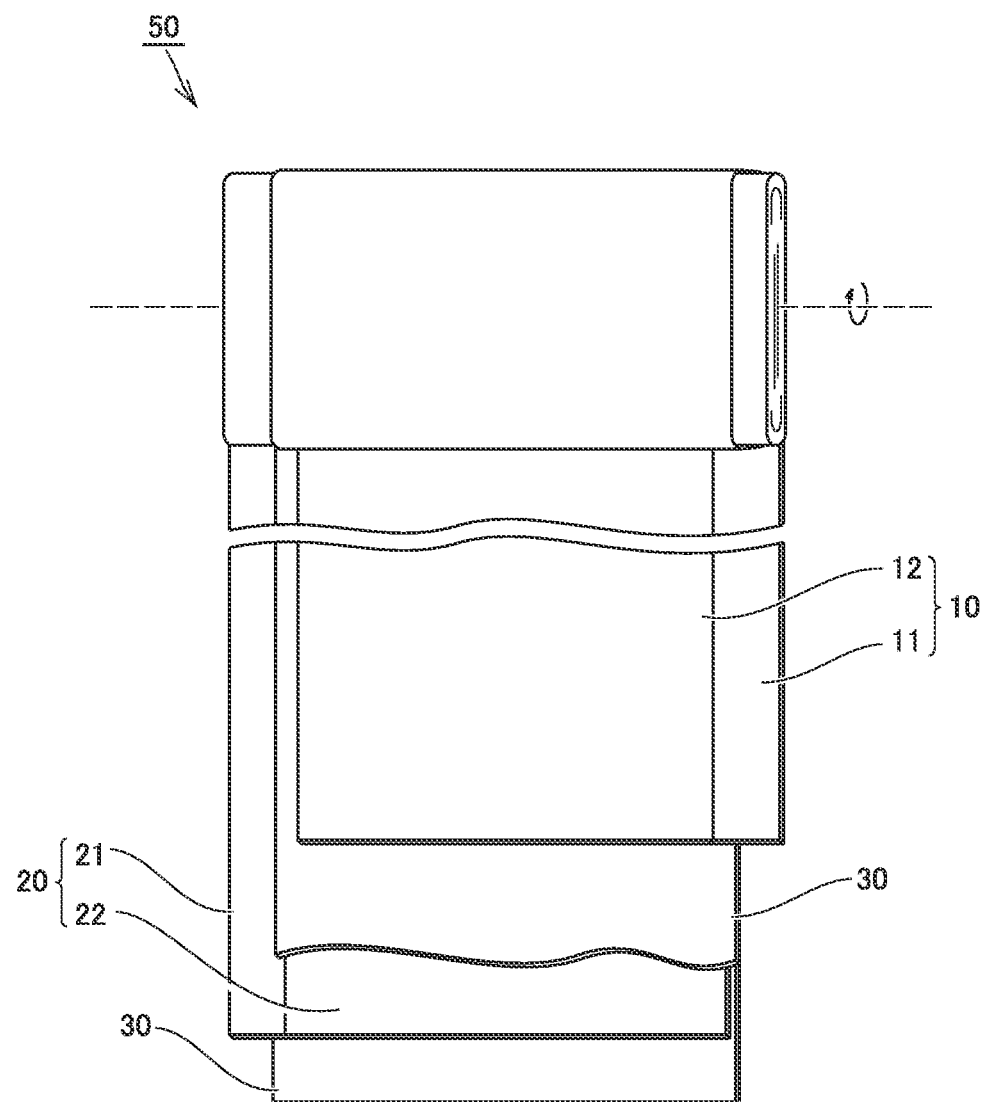
FIG. 5 is a schematic diagram illustrating an example configuration of an electrode group according to an embodiment.

FIG. 5 is a schematic diagram illustrating an example configuration of an electrode group according to the present embodiment. The electrode group 50 is a winding type. In other words, the electrode group 50 may be formed, for example, by stacking a positive electrode 10, a separator 30, a negative electrode and the separator 30 in order and winding the same spirally. The electrode group 50 may be formed into a flat shape. It should be noted that the electrode group of the present embodiment may be formed into a stack type. The stack-type electrode group is formed by alternately stacking the positive electrode and the negative electrode with the separator sandwiched between the positive electrode and the negative electrode.

"Positive Electrode"

Figure 6:
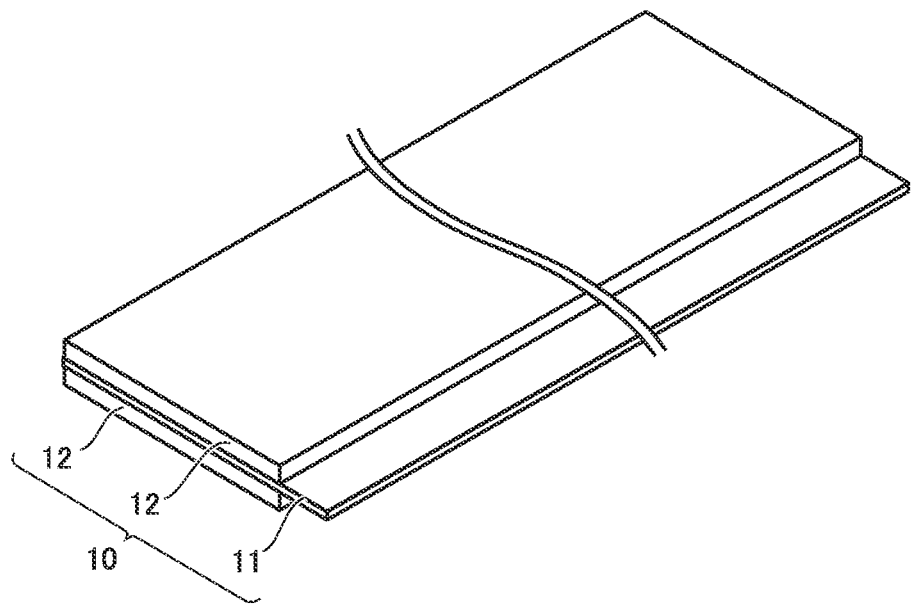
FIG. 6 is a schematic diagram illustrating an example configuration of a positive electrode according to an embodiment.

FIG. 6 is a schematic diagram illustrating an example configuration of a positive electrode according to the present embodiment. The positive electrode 10 is in the form of a strip-shaped sheet. The positive electrode 10 includes a positive electrode current collector 11 and a positive electrode composite material layer 12. The positive electrode composite material layer 12 is supported on the surface of the positive electrode current collector 11. The positive electrode composite material layer 12 contains a positive electrode active material. The positive electrode 10 may have a portion where the positive electrode current collector 11 is exposed from the positive electrode composite material layer 12 so as to provide a connection to the terminal 81.

[Positive Electrode Current Collector]

The positive electrode current collector 11 is an electrode substrate having conductivity. The positive electrode current collector 11 may have a thickness of, for example, 5 μm or more and 50 μm or less. The positive electrode current collector 11 may be, for example, a pure Al foil, an Al alloy foil or the like.

[Positive Electrode Composite Material Layer]

The positive electrode composite material layer 12 is formed on a surface (both of the front surface and the rear surface or only one surface) of the positive electrode current collector 11. The positive electrode composite material layer 12, for example, may have a thickness of 10 to 200 μm or a thickness of 100 to 200 μm. The positive electrode composite material layer 12 may contain, for example, a positive electrode active material at 80 to 98 mass %, a conductive material at 1 to 15 mass %, and a binder as the remainder.

"Negative Electrode"

Figure 7:
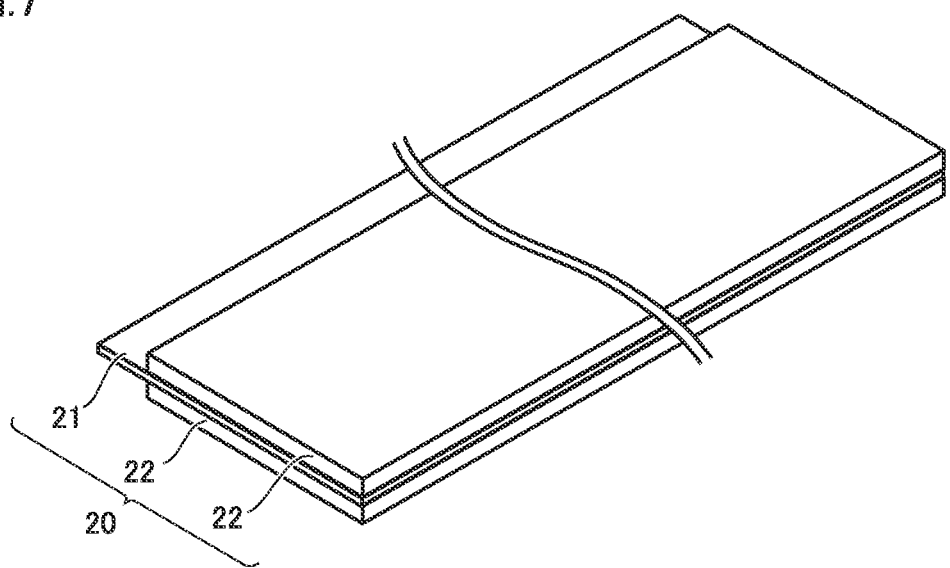
FIG. 7 is a schematic diagram illustrating an example configuration of a negative electrode according to an embodiment.

FIG. 7 is a schematic diagram illustrating an example configuration of a negative electrode according to the present embodiment. The negative electrode 20 is in the form of a strip-shaped sheet. The negative electrode 20 includes a negative electrode current collector 21 and a negative electrode composite material layer 22 formed on a surface of the negative electrode current collector 21. The negative electrode composite material layer 22 is supported on the surface of the negative electrode current collector 21, for example. The negative electrode 20 may have a portion where the negative electrode current collector 21 is exposed from the negative electrode composite material layer 22 so as to provide a connection to the terminal 81.

[Negative Electrode Current Collector]

The negative electrode current collector 21 may have a thickness of, for example, 5 to 30 μm. The negative electrode current collector 21 may be, for example, a Cu foil. The Cu foil may be a pure Cu foil or a Cu alloy foil.

[Negative Electrode Composite Material Layer]

The negative electrode composite material layer 22 is formed on a surface (both of the front surface and the rear surface or only one surface) of the negative electrode current collector 21. The negative electrode composite material layer 22, for example, may have a thickness of 10 to 200 μm or a thickness of 50 to 150 μm.

The negative electrode composite material layer 22 includes a negative electrode active material containing silicon oxide and heat expandable microcapsules. In addition, the negative electrode composite material layer 22 may further contain other additives (a binder, a thickener and the like).

(Negative Electrode Active Material)

The negative electrode active material in the present embodiment contains silicon oxide. Silicon oxide is a compound represented by the general formula "$SiO_x$" ($0.01 \leq x < 2$). In the general formula, x is preferably $0.1 \leq x \leq 1.5$, more preferably $0.5 \leq x \leq 1.5$, and further preferably $0.5 \leq x \leq 1.0$. Hereinafter, such silicon oxide may be simply abbreviated as "SiO" where appropriate. Since SiO has a higher capacity than the carbon-based negative electrode active material, the capacity of the secondary battery can be improved by including SiO in the negative electrode composite material layer.

The negative electrode active material may contain other active materials such as a carbon-based negative electrode active material other than silicon oxide. The term of "carbon-based negative electrode active material" refers to such a material that includes carbon atoms and capable of storing and releasing Li ions. The carbon-based negative electrode active material may be at least one selected from a group consisting of graphite, amorphous carbon-coated graphite, easily graphitizable carbon (soft carbon) and hardly graphitizable carbon (hard carbon). By including the carbon-based negative electrode active material in the negative electrode composite material layer, it is possible to improve the balance between capacity, output characteristics, cycle characteristics and the like.

In the present embodiment, the ratio of silicon oxide to the total amount of the negative electrode active material (the sum of silicon oxide and the carbon-based negative electrode active material) is 30% by mass or less. If the ratio exceeds 30 mass %, it tends to be difficult to sufficiently suppress further temperature rise caused by the heat generated from an internal short circuit or the like. The ratio of silicon oxide to the total amount of the negative electrode active material is preferably 1 mass % or more to 30 mass % or less, and more preferably 5 mass % or more to 25 mass % or less.

(Heat Expandable Microcapsule)

The heat expandable microcapsule of the present embodiment is a nano-structured material which expands by heating.

The heat expandable microcapsule includes, for example, a shell (outer shell) made of a thermoplastic resin and a thermal expansion agent enclosed in the shell. When such heat expandable microcapsule is heated, the shell (thermoplastic resin) softens, and meanwhile the thermal expansion agent inside the shell vaporizes or sublimates, which increases the internal pressure of the shell, and thus, the heat expandable microcapsule expand rapidly.

The expansion coefficient of the heat expandable microcapsules is, for example, about 2 to 100 times in volume ratio. Thus, it is possible for the heat expandable microcapsules contained in the negative electrode composite material layer to expand sufficiently enough to fill the voids resulted from the contraction of silicon oxide (SiO) particles.

Therefore, by containing a large number of the heat expandable microcapsules, when the temperature rises, the heat expandable microcapsules may expand so as to expel the electrolyte solution that has entered the negative electrode composite material layer out of the voids. Therefore, the blending ratio of the heat expandable microcapsules to the total amount of the negative electrode active material is preferably 0.5% by mass or more. On the other hand, when the content of the heat-expandable microcapsules increases, the resistance of the battery tends to increase. Therefore, the blending ratio of the heat expandable microcapsules to the total amount of the negative electrode active material is preferably 25 mass % or less, and more preferably 20 mass % or less.

It is preferable that the initial softening temperature of the shell (thermoplastic resin) and the initial expansion (vaporization or sublimation) temperature of inclusions (thermal expansion agent) are higher than the normal operation temperature (for example, room temperature to about 80° C.) of the battery and lower than the temperature (for example, 80 to 180° C.) at which the thermal runaway caused by the heat generated from an internal short circuit or the like in the battery starts, and specifically at about 100° C. to 160° C., for example. As a result, the heat expandable microcapsules expand only when the battery becomes hot due to the heat generated from an internal short circuit or the like, so that it is possible to prevent the battery from being damaged by the expansion of the heat expandable microcapsules during normal operation of the battery. In order to prevent the shell from breaking, it is desired that the shell should soften before the thermal expansion agent starts to expand. Thus, it is preferable that the initial softening temperature of the shell is lower than the initial expansion temperature of the thermal expansion agent.

Preferably, the thermoplastic resin constituting the shell is excellent in resistance to the electrolyte solution and excellent in gas barrier. As examples of the thermoplastic resin, a (co) polymer containing vinylidene chloride, a (co) polymer containing (meth)acrylonitrile or the like may be given. In order to improve the foaming property, the heat resistance and the like of the heat expandable microcapsules, a cross-linkable monomer may be formulated into the thermoplastic resin in the preparation of the heat expandable microcapsules.

As examples of the thermal expansion agent enclosed in the shell, an organic compound such as volatile hydrocarbons may be given. As examples of volatile hydrocarbons having a boiling point of 100° C. or less, propane, propylene, n-butane, isobutane, butene, isobutene, isopentane, neopentane, n-pentane, n-hexane, isohexane, heptanes, petroleum ether or the like may be given. Taken into consideration its stability in the battery, any incombustible or flame retardant compound such as halogenated hydrocarbons, chlorofluorocarbons or the like such as methyl chloride, methylene chloride, fluorotrichloromethane, difluorodichloromethane, chlorotrifluoromethane or the like may be used as the thermal expansion agent. These compounds may be used alone in one kind or in combination of two or more kinds.

The heat expandable microcapsules may be prepared by various known methods. For example, the heat expandable microcapsules may be prepared by suspension polymerizing a polymerizable mixture containing at least a thermal expansion agent and a polymerizable monomer for yielding a thermoplastic resin constituting the shell in an aqueous dispersion medium. Specifically, a manufacturing method disclosed in, for example, JP42-26524B, JP62-286534A, JP4-292643A, JP11-209504A or the like may be used to produce the heat expandable microcapsules. In the suspension polymerization for microencapsulation, the thermal expansion agent may be used in a ratio of, for example, about 5 to 100 parts by weight relative to 100 parts by weight of the polymerizable monomer (including the crosslinkable monomer) which yields the thermoplastic resin constituting the shell.

Commercially available products of the heat expandable microcapsules may include Matsumoto Microsphere (registered trademark) FN-100SS (initial expansion temperature: 120° C.), Matsumoto Microsphere (registered trademark) FN-80 GS (initial expansion temperature: 100° C.), Matsumoto Microsphere (registered trademark) F-48 (initial expansion temperature: 90° C.), Matsumoto Microsphere (registered trademark) F-65 (initial expansion temperature: 110° C.) and the like manufactured by Matsumoto Yushi Seiyaku Co., Ltd.

The average particle size of the heat expandable microcapsules is preferably 5 to 30 μm. The average particle size in the present specification represents the particle size of 50% accumulation from the finest particle in the volume-based particle size distribution measured by a laser diffraction scattering method. Further, it is preferable that the heat expandable microcapsules have a sharp particle size distribution. In this case, the initial expansion temperature of each heat expandable microcapsule is less dispersed, and thereby, all of the heat expandable microcapsules may expand quickly as a predetermined temperature is reached so as to rapidly fill the voids resulted from the contraction of SiO.

The average particle size and particle size distribution of the heat expandable microcapsules may be controlled by any method commonly used in the field. For example, the average particle size and particle size distribution of the heat expandable microcapsules may be controlled by selecting the type and amount of dispersion stabilizers, emulsification/dispersion means and emulsification conditions or the like in the suspension polymerization for preparing the heat expandable microcapsules.

The heat expandable microcapsule may be included in the negative electrode composite material layer by any conventionally known method. For example, a negative electrode composite material slurry containing a negative electrode active material, the heat expandable microcapsules, a binder, a solvent and the like is coated on a surface of a negative electrode current collector and dried to form a negative electrode composite material layer, and whereby to include the heat expandable microcapsules in the negative electrode composite material layer.

The ratio of the heat expandable microcapsules in contact with silicon oxide to the total amount of the heat expandable microcapsules contained in the negative electrode composite material layer is 70 mass % or more. In this case, when heat is generated from an internal short circuit or the like, since the heat expandable microcapsules are positioned in the vicinity of silicon oxide, it is possible for the expanded heat expandable microcapsules to reliably fill the voids resulted from the contraction of silicon oxide. As a result, the electrolyte solution is prevented from reacting with the negative electrode active material so as to reliably suppress further temperature rise. The upper limit of the ratio of the heat expandable microcapsules in contact with silicon oxide is not particularly limited, and it may be 100 mass %.

As a method for improving the ratio of the heat expandable microcapsules in contact with silicon oxide, for example, when a negative electrode is prepared by applying a negative electrode composite material paste on a surface of a negative electrode current collector and drying, SiO particles and the heat expandable microcapsules are mixed in advance, and then the mixture is blended with other components of the negative electrode composite material layer and the solvent to prepare the negative electrode composite material paste. Thus, by modifying the ratio of the SiO particles and the heat expandable microcapsules to be mixed in advance relative to the total amount of the SiO particles and the heat expandable microcapsules to be included in the electrode composite material layer, it is possible to adjust the ratio of the heat expandable microcapsules in contact with silicon oxide.

(Other Components)

The negative electrode composite material layer may contain a binder, a thickener, a conductive material, and the like as other components in addition to those described above. As examples of the binder, styrene butadiene rubber (SBR), acrylonitrile butadiene rubber (NBR), polytetrafluoroethylene (PTFE) and the like may be given. As examples of the thickener, carboxymethyl cellulose (CMC), alginic acid, hydroxypropylmethyl cellulose (HPMC), polyethylene oxide (PEO), polyacrylic acid (PAA), polysaccharide thickener and the like may be given.

"Separator"

The separator 30 is in the form of a strip-shaped sheet. The separator 30 is interposed between the positive electrode 10 and the negative electrode 20. The separator 30 is an electrically insulating porous film. The separator 30 may have a thickness of, for example, 10 to 50 μm. The separator 30 may be made of, for example, polyethylene (PE), polypropylene (PP) or the like. The separator 30 may have a multilayer structure. The separator 30 may be formed, for example, by laminating a porous PP film, a porous PE film, and a porous PP film in order.

"Electrolyte Solution (Non-Aqueous Electrolyte)"

The electrolyte solution is impregnated in the electrode group 50. A part of the electrolyte solution is stored in the battery case 80. In FIG. 4, the dot-chain line indicates the liquid surface of the electrolyte solution.

The electrolyte solution contains at least a lithium (Li) salt and a solvent. The electrolyte solution may contain, for example, 0.5 mol/L or more and 2 mol/L or less of a Li salt. The Li salt is a supporting electrolyte. The Li salt is dissolved in the solvent. The Li salt may be, for example, $LiPF_6$, $LiBF_4$, $Li[N(FSO_2)_2]$, $Li[N(CF_3SO_2)_2]$ or the like. The Li salt may be used alone in one kind or in combination of two or more kinds.

The solvent is aprotic. In other words, the electrolyte solution of the present embodiment is non-aqueous. The solvent may be, for example, a mixture of cyclic carbonate and chain carbonate. The mixing ratio may be, for example, cyclic carbonate:chain carbonate=1:9 to 5:5 in volume ratio.

The cyclic carbonate may be, for example, ethylene carbonate (EC), propylene carbonate (PC), butylene carbonate (BC), fluoroethylene carbonate (FEC) or the like. The cyclic carbonate may be used alone in one kind or in combination of two or more kinds.

The chain carbonate may be, for example, dimethyl carbonate (DMC), ethyl methyl carbonate (EMC), diethyl carbonate (DEC) or the like. The chain carbonate may be used alone in one kind or in combination of two or more kinds.

The solvent may include, for example, lactone, cyclic ether, chain ether, and carboxylic ester or the like. The lactone may be, for example, γ-butyrolactone (GBL), δ-valerolactone or the like. The cyclic ether may be, for example, tetrahydrofuran (THF), 1,3-dioxolane, 1,4-dioxane or the like. The chain ether may be, for example, 1,2-dimethoxyethane (DME) or the like. The carboxylic ester may be, for example, methyl formate (MF), methyl acetate (MA), methyl propionate (MP) or the like.

<Usage>

The negative electrode according to the present embodiment may be used as a negative electrode for a secondary battery such as a lithium ion secondary battery (non-aqueous electrolyte secondary battery), for example. The secondary battery may be used as a power source of, for example, a hybrid vehicle (HV), an electric vehicle (EV), a plug-in hybrid vehicle (PHV) or the like. However, the usage of the positive electrode manufactured by the manufacturing method of the present disclosure is not limited, it may be applied to any secondary battery.

EXAMPLES

Hereinafter, examples of the present disclosure will be described. It should be noted that the following examples are not intended to limit the scope of the present disclosure. Hereinafter, the non-aqueous electrolyte secondary battery may be abbreviated as "battery" where necessary.

Comparative Examples 1 to 4

"Manufacture of Negative Electrode"

The following materials were prepared.

negative electrode active material: graphite (carbon-based negative electrode active material) (average particle size: 20 μm), and silicon oxide (average particle size: 20 μm)

binder: SBR
thickener: CMC
solvent: water
negative electrode current collector: copper foil (thickness: 10 μm)

Note that in Comparative examples 1 to 4, the ratio of graphite to the total amount (100%) of graphite and silicon oxide and the ratio of silicon oxide to the total amount (100%) of graphite and silicon oxide were modified as listed in the column of "ratio of active material" in Table 1.

10 parts by mass of the negative electrode active material (graphite and silicon oxide), 1 part by mass of the binder, and 1 part by mass of the thickener were mixed, then the solvent was added to the mixture, and the mixture was kneaded to prepare a negative electrode composite material paste (slurry). The addition amount of the solvent was adjusted so that the nonvolatile fraction of the obtained negative electrode composite material paste was 50 mass %. The term of "nonvolatile fraction" refers to a mass ratio of the component (nonvolatile components) other than the solvent to the total mass of all of the raw materials including the solvent.

The prepared negative electrode composite material slurry was applied to the surfaces (the front and back surfaces) of the negative electrode current collector by using a die coater and dried to form a negative electrode (negative electrode sheet) in which the negative electrode composite material layer was formed on both surfaces of the negative electrode current collector. The thickness of the negative electrode sheet was 80 μm, and the width of the negative electrode composite material layer was 100 mm. The obtained negative electrode (negative electrode sheet) was cut into a predetermined length (3300 mm). In this manner, the negative electrode of each of Comparative examples 1 to 4 was manufactured.

Comparative Example 5, Examples 1 to 4

In Comparative example 5 and Examples 1 to 4, the heat expandable microcapsules were further blended in the negative electrode composite material material. Matsumoto Microsphere (registered trademark) FN-100 SS (average particle size: 6 to 11 μm, initial expansion temperature: 120° C.) manufactured by Matsumoto Yushi Seiyaku Co., Ltd was used as the heat expandable microcapsules. The shell of each heat expandable microcapsule is made of acrylonitrile-based resin, and hydrocarbon serving as the thermal expansion agent is housed in the shell. All of the heat expandable microcapsules and silicon oxide were mixed preliminarily in powder, and the mixture was blended with other materials of the negative electrode composite material layer and the solvent to prepare a negative electrode composite paste. The powder mixing was carried out with a high-speed mixer at 1000 rpm for 5 minutes. The negative electrode of each of Comparative example 5 and Examples 1 to 4 was manufactured in the same manner as in Comparative example 2 except that in Comparative example 5 and Examples 1 to 4, the blending ratio of the heat expandable microcapsules to the total amount of the negative electrode active material was modified as listed in Table 1.

Example 5, Example 6, Comparative Example 6

The negative electrode of each of Example 5, Example 6 and Comparative example 6 was manufactured in the same manner as in Example 2 except that the ratio of graphite to the total amount (100%) of graphite and silicon oxide and the ratio of silicon oxide to the total amount (100%) of graphite and silicon oxide were modified as listed in the column "ratio of active material" in Table 1.

Example 7

The negative electrode of Example 7 was manufactured in the same manner as in Example 2 except that only a half of the heat expandable microcapsules was mixed with silicon oxide in powder.

Comparative Example 7

The negative electrode of Comparative example 7 was manufactured in the same manner as in Example 2 except that the powder mixing of the heat expandable microcapsule and silicon oxide was not performed.

Comparative Examples 8 and 9

The negative electrode of each of Comparative examples 8 and 9 was manufactured in the same manner as in Comparative example 5 and Example 1 except that releasable (inclusion-releasable) microcapsules were used instead of the heat expandable microcapsules. As the releasable microcapsules, the microcapsules prepared as described in paragraph [0029] of JP10-270084A (PTD 2) were used. Specifically, such releasable microcapsule is composed of hexamethylene diisocyanate serving as the shell and trimethylolpropane triacrylate serving as an inclusion (polymer) in the shell.

<Measurement of the Ratio of Microcapsules in Contact with SiO>

With respect to the negative electrode composite material layer of each negative electrode obtained in the above examples and comparative examples, the ratio of the microcapsules in contact with SiO (relative to the total amount of the microcapsules) was measured by observing a cross section of each negative electrode under a scanning electron microscope and calculating the number of microcapsules in contact with SiO relative to the number of microcapsules in the entire field of view. The measurement results are shown in Table 1.

<Manufacture of Secondary Battery>

A non-aqueous electrolyte secondary battery (lithium ion secondary battery) was manufactured by using the negative electrode of each of the above examples and comparative examples.

"Manufacture of Positive Electrode"

The following materials were prepared.

positive electrode active material: lithium-nickel-cobalt-manganese composite oxide ($LiNi_{1/3}Co_{1/3}Mn_{1/3}O_2$)
conductive material: acetylene black (AB)
binder: polyvinylidene fluoride (PVDF)
solvent: N-methyl-2-pyrrolidone (NMP)
positive electrode current collector: aluminum foil (thickness: 20 μm)

100 parts by mass of the positive electrode active material, 10 parts by mass of the conductive material, and 3 parts by mass of the binder were mixed in solvent to prepare a positive electrode material paste. The positive electrode composite material paste was applied to the surfaces (both surfaces) of the positive electrode current collector by using a die coater and dried to form a positive electrode composite material layer (thickness: 50 μm, width: 94 mm, uncoated width: 20 mm). Thereby, a positive electrode was manufactured. The positive electrode was further compressed by a roll press machine and cut into strips. The obtained positive electrode had a thickness of 70 μm and a length of 3000 mm. In addition, the positive electrode composite material layer had a width of 94 mm, and an uncoated width of 20 mm.

"Separator"

A strip-like separator (porous film) was prepared. The separator has a thickness of 20 μm. The separator has a three-layer structure. The three-layer structure is formed by laminating a polypropylene porous layer, a polyethylene porous layer and a polypropylene porous layer in order. A heat resistant layer was formed on one surface of the separator, and such separator was used for manufacturing an electrode group.

"Manufacture of Electrode Group"

A positive electrode, a separator, a negative electrode, and a separator were stacked with the separator interposed between the positive electrode and the negative electrode, and further wound into a flat shape to prepare a winding type electrode group. A rectangular battery case was prepared from aluminum. The ends of a core member of the electrode group were connected to a pair of terminals, and the electrode group was housed in the battery case.

An electrolyte solvent was prepared by mixing ethylene carbonate (EC), dimethyl carbonate (DMC) and ethyl methyl carbonate (EMC). By dispersing and dissolving $LiPF_6$ in the electrolyte solvent, an electrolyte solution having the following composition was prepared.

Electrolyte solvent: [EC:DMC:EMC=3:3:4 (volume ratio)]

$LiPF_6$: 1.0 mol/L

A predetermined amount of electrolyte solution was injected into the battery case, and the battery case was hermetically sealed. Thereby, a non-aqueous electrolyte secondary battery was manufactured. The theoretical capacity of the battery was 4 Ah.

<Evaluation of Battery Performance>

[Measurement of Room Temperature Resistance]

The battery of each of the above examples and comparative examples was charged to 3.7 V and then discharged at a current rate of 40 A (10 C) for 10 seconds under an environmental temperature of 25° C. so as to determine the resistance (room temperature resistance) of the battery based on the relationship between the voltage drop amount and the current rate. "C" is a unit of current rate. "1 C" represents a current rate at which the state-of-charge (SOC) reaches from 0% to 100% in 1 hour's charging. The measurement results are listed in Table 1.

[Nail Penetration Test]

The nail penetration test was conducted. Specifically, the battery was charged to 4.1 V at a current rate of 4 A (1 C). Thereafter, a nail having a diameter of 3.0 mm was pierced into the battery at a speed of 1.0 mm/sec. The temperature at the central portion of a side surface of the battery at 20 seconds after the nail penetration test (20 seconds after the completion of the nail penetration test) was measured by a thermocouple provided in the central portion. The measurement results are listed in Table 1.

Furthermore, the state of the battery (the presence of smoking) at 2 minutes after the nail penetration test (2 minutes after the completion of the nail penetration test) was visually observed. The observation results are listed in Table 1.

TABLE 1

| | Ratio of active material [mass %] | | Heat expandable microcapsule | | Mixing Blending ratio of SiO and microcapsules in [mass %] powder | | Ratio of microcapsules in contact with SiO [mass %] | Evaluation of Battery Performance | | |
|---|---|---|---|---|---|---|---|---|---|---|
| | | | | | | | | Temperature at 20 seconds after nail penetration test [° C.] | State at 2 minutes after nail penetration test | room temperature resistance [mΩ] |
| | Graphite | SiO | Type | | | | | | | |
| Comparative Example 1 | 99 | 1 | heat expandable | 0 | — | | — | 147 | smoking | 4.2 |
| Comparative Example 2 | 90 | 10 | heat expandable | 0 | — | | — | 162 | smoking | 4.5 |

TABLE 1-continued

| | Ratio of active material [mass %] | | Heat expandable microcapsule | | Mixing | Ratio of microcapsules in contact with SiO [mass %] | Evaluation of Battery Performance | | |
|---|---|---|---|---|---|---|---|---|---|
| | | | | Blending ratio [mass %] | of SiO and microcapsules in powder | | Temperature at 20 seconds after nail penetration test [° C.] | State at 2 minutes after nail penetration test | room temperature resistance [mΩ] |
| | Graphite | SiO | Type | | | | | | |
| Comparative Example 3 | 70 | 30 | heat expandable | 0 | — | — | 170 | smoking | 4.8 |
| Comparative Example 4 | 0 | 100 | heat expandable | 0 | — | — | 180 | smoking | 5.3 |
| Comparative Example 5 | 90 | 10 | heat expandable | 0.3 | SiO and all of the microcapsules | 89 | 145 | smoking | 4.5 |
| Example 1 | 90 | 10 | heat expandable | 0.5 | | 90 | 120 | no smoking | 4.5 |
| Example 2 | 90 | 10 | heat expandable | 10 | | 85 | 82 | no smoking | 4.9 |
| Example 3 | 90 | 10 | heat expandable | 20 | | 75 | 85 | no smoking | 5.9 |
| Example 4 | 90 | 10 | heat expandable | 25 | | 73 | 81 | no smoking | 7.2 |
| Example 5 | 99 | 1 | heat expandable | 10 | SiO and all of the microcapsules | 70 | 93 | no smoking | 4.6 |
| Example 6 | 70 | 30 | heat expandable | 10 | | 89 | 95 | no smoking | 5.3 |
| Comparative Example 6 | 0 | 100 | heat expandable | 10 | | 95 | 145 | smoking | 5.8 |
| Example 7 | 90 | 10 | heat expandable | 10 | SiO and half of the microcapsules | 70 | 86 | no smoking | 5.0 |
| Comparative Example 7 | 90 | 10 | heat expandable | 10 | no powder mixing | 58 | 150 | smoking | 5.0 |
| Comparative Example 8 | 90 | 10 | releasable | 10 | no powder mixing | 60 | 140 | smoking | 5.2 |
| Comparative Example 9 | 90 | 10 | releasable | 10 | SiO and all of the microcapsules | 84 | 144 | smoking | 5.1 |

<Results>

With reference to the results listed in Table 1, firstly, from the results of Comparative examples 1 to 4, it is obvious that when SiO is included as the negative electrode active material, the battery temperature after the nail penetration test is higher (at the time when heat is generated from an internal short circuit or the like), which makes smoking easy to occur, and as the ratio of SiO increases, smoking is more likely to occur. The reason may be explained in the following. Specifically, since SiO contracts greatly due to discharging caused by an internal short circuit during the nail penetration so as to form voids in the negative electrode composite material layer, and when the electrolyte solution flows into the voids, it will react with the negative electrode active material, which leads to further temperature rise (thermal runaway).

From the results of Comparative example 5 and Examples 1 to 4, it is obvious that when the blending ratio of the heat expandable microcapsules is less than 0.5% by mass, smoking occurs after the nail penetration test, and the thermal runaway can not be suppressed. The reason therefor may be that the voids in the negative electrode composite material could not be filled sufficiently, and thereby the electrolyte solution could not be sufficiently expelled out of the voids, which causes an exothermic reaction to occur between the electrolyte solution and the negative electrode. Thus, it is considered that when the blending ratio of the heat expandable microcapsules is 0.5% by mass or more, the temperature rise caused by the heat generated from an internal short circuit or the like may be sufficiently suppressed.

Moreover, it is obvious that as the blending ratio of the heat expandable microcapsules increases, the battery resistance (room temperature resistance) increases. The reason therefor may be that the heat expandable microcapsules are insulating. From the viewpoint of suppressing the increase in battery resistance, the blending ratio of the heat expandable microcapsules to the total amount of the negative electrode active material is preferably 25 mass % or less, and more preferably 20 mass % or less.

From the results of Examples 5 and 6, it is obvious that even when the ratio of SiO in the negative electrode active material is modified, it is still possible to suppress the temperature rise after the nail penetration test. However, in Comparative example 6 (SiO: 100 mass %), the temperature rise after the nail penetration test can not be sufficiently suppressed, and smoking was observed. It means that if the blending ratio of SiO to the total amount of the negative electrode active material (the carbon-based negative electrode active material and silicon oxide) is too large, it is difficult to sufficiently suppress the temperature rise after the nail penetration test (at the time when heat is generated from an internal short circuit or the like), and smoking is likely to occur. It is considered that when the ratio of SiO to the total amount of the negative electrode active material is 30 mass % or less, the temperature rise caused by the heat generated from an internal short circuit or the like may be sufficiently suppressed.

From the results of Examples 2 and 7 and Comparative example 7, it is obvious that when (all or a half of) the heat expandable microcapsules were previously mixed with SiO in powder, in other words, when the ratio of the heat expandable microcapsules in contact with silicon oxide (SiO) to the total amount of the heat expandable microcapsules contained in the negative electrode composite material layer is 70 mass % or more, the electrolyte solution is prevented from reacting with the negative electrode active material when heat is generated from an internal short circuit or the like, which makes it possible to reliably suppress further temperature rise. This is because that when heat is generated from an internal short circuit or the like, since the heat expandable microcapsules are positioned in the vicinity of silicon oxide, it is possible for the expanded heat expandable microcapsules to reliably fill the voids resulted from the contraction of silicon oxide.

From the results of Comparative examples 8 and 9, it is obvious that when the releasable microcapsules disclosed in PTD 2 were blended in the negative electrode composite material layer of a conventional battery, the battery is weaker in suppressing the temperature rise than the battery which is blended with the heat expandable microcapsules according to any of the examples. The reason therefor may be that the flow rate or speed of the electrolyte solution flowing into the voids of the negative electrode composite material layer formed by the contraction of SiO is faster than the release rate or speed of inclusions out of the releasable microcapsules for inhibiting the reaction from occurring in the battery. It is also obvious that in Comparative examples 8 and 9, even the microcapsules and SiO are mixed in advance, the effect of suppressing the temperature rise after the nail penetration test is not improved.

The embodiments and examples disclosed herein are illustrative and non-restrictive in any respect. The technical scope indicated by the claims is intended to include any modifications within the scope and meaning equivalent to the terms of the claims.

What is claimed is:

1. A negative electrode for a non-aqueous electrolyte secondary battery, comprising:
   a negative electrode current collector; and
   a negative electrode composite material layer formed on a surface of the negative electrode current collector,
   the negative electrode composite material layer including:
      a negative electrode active material containing (a) silicon oxide and (b) a carbon-based negative electrode active material; and
      heat expandable microcapsules,
   the ratio of silicon oxide to the total amount of the negative electrode active material being 1 mass % or more and 30 mass % or less,
   the blending ratio of the heat expandable microcapsules to the total amount of the negative electrode active material being 0.5 mass % or more, and
   the ratio of the heat expandable microcapsules in contact with silicon oxide to the total amount of the heat expandable microcapsules contained in the negative electrode composite material layer being 70 mass % or more.

2. The negative electrode according to claim 1, wherein each of the heat expandable microcapsules includes a shell made of a thermoplastic resin and a thermal expansion agent enclosed in the shell.

3. A non-aqueous electrolyte secondary battery comprising the negative electrode according to claim 1.

4. The negative electrode according to claim 1, wherein the ratio of silicon oxide to the total amount of the negative electrode active material is 5 mass % or more and 30 mass % or less.

5. The negative electrode according to claim 1, wherein the ratio of silicon oxide to the total amount of the negative electrode active material is 1 mass % or more and 25 mass % or less.

6. The negative electrode according to claim 1, wherein the ratio of silicon oxide to the total amount of the negative electrode active material is 5 mass % or more and 25 mass % or less.

7. The negative electrode according to claim 1, wherein the ratio of silicon oxide to the total amount of the negative electrode active material is 10 mass % or more and 30 mass % or less.

8. The negative electrode according to claim 1, wherein the blending ratio of the heat expandable microcapsules to the total amount of the negative electrode active material is 0.5 mass % or more and 25 mass % or less.

9. The negative electrode according to claim 1, wherein the blending ratio of the heat expandable microcapsules to the total amount of the negative electrode active material is 0.5 mass % or more and 20 mass % or less.

10. The negative electrode according to claim 1, wherein the mass ratio of the silicon oxide to the carbon-based negative electrode active material is 1:99 to 30:70.

11. The negative electrode according to claim 1, wherein the mass ratio of the silicon oxide to the carbon-based negative electrode active material is 5:95 to 25:75.

12. The negative electrode according to claim 1, wherein the mass ratio of the silicon oxide to the carbon-based negative electrode active material is 10:90 to 30:70.

13. The negative electrode according to claim 10, wherein the negative electrode active material is obtained by mixing the silicon oxide and the heat expandable microcapsules to obtain a first mixture; and then adding the carbon-based negative electrode active material to the first mixture.

14. The negative electrode according to claim 10, wherein the negative electrode active material is obtained by powder mixing the silicon oxide and the heat expandable microcapsules to obtain a first powder; and then adding a solvent and the carbon-based negative electrode active material to the first powder.

15. The negative electrode according to claim 10, wherein the negative electrode active material is obtained by mixing the silicon oxide in the form of a powder with the heat expandable microcapsules to obtain a first mixture; and then adding a solvent and the carbon-based negative electrode active material to the first mixture.

16. The negative electrode according to claim 11, wherein the negative electrode active material is obtained by mixing the silicon oxide in the form of a powder with the heat expandable microcapsules to obtain a first mixture; and then adding a solvent the carbon-based negative electrode active material to the first mixture.

17. The negative electrode according to claim 12, wherein the negative electrode active material is obtained by mixing the silicon oxide in the form of a powder with the heat expandable microcapsules to obtain a first mixture; and then adding a solvent the carbon-based negative electrode active material to the first mixture.

* * * * *